United States Patent
Nakai et al.

(10) Patent No.: US 10,300,983 B2
(45) Date of Patent: May 28, 2019

(54) OPERATING ASSEMBLY

(71) Applicant: Shimano Inc., Sakai, Osaka (JP)

(72) Inventors: Mototsugu Nakai, Osaka (JP); Kohei Obuchi, Osaka (JP); Kentaro Kosaka, Osaka (JP); Takahiro Yamashita, Osaka (JP); Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/667,930

(22) Filed: Aug. 3, 2017

(65) Prior Publication Data
US 2019/0039683 A1 Feb. 7, 2019

(51) Int. Cl.
*B62K 23/06* (2006.01)
*B62L 3/02* (2006.01)
*B62M 25/04* (2006.01)

(52) U.S. Cl.
CPC ............... *B62L 3/02* (2013.01); *B62K 23/06* (2013.01); *B62L 3/023* (2013.01); *B62M 25/04* (2013.01)

(58) Field of Classification Search
CPC ........... B62K 23/06; B62L 3/023; B62L 3/02; B62M 25/04
See application file for complete search history.

(56) References Cited

U.S. PATENT DOCUMENTS

| | | | |
|---|---|---|---|
| 6,112,614 A * | 9/2000 | Yamashita | B62L 3/02 74/489 |
| 6,336,525 B1 | 1/2002 | Leng | |
| 7,353,732 B2 * | 4/2008 | Renshaw | B62K 21/12 74/551.8 |
| 7,530,435 B2 | 5/2009 | Lumpkin | |
| 8,201,477 B2 * | 6/2012 | Kawakami | B62K 23/06 74/502.2 |
| 2002/0070084 A1 | 6/2002 | Chou | |
| 2013/0152726 A1 * | 6/2013 | Miki | B62K 21/26 74/551.9 |
| 2015/0000455 A1 * | 1/2015 | Hirotomi | B62K 23/06 74/491 |

(Continued)

FOREIGN PATENT DOCUMENTS

| | | | |
|---|---|---|---|
| DE | 212008000049 U1 | 3/2010 | |
| DE | 202014000348 U1 * | 4/2014 | ............. B62L 3/023 |
| DE | 202014000348 U1 | 4/2014 | |

(Continued)

*Primary Examiner* — Luis A Gonzalez
(74) *Attorney, Agent, or Firm* — Global IP Counselors, LLP

(57) ABSTRACT

An operating assembly for a small vehicle including a bicycle is basically provided with a base member, an operating member, a handlebar fixing structure and a handlebar spacer. The base member includes a support. The operating member is movably coupled to the base member. The handlebar fixing structure is coupled to base member. The handlebar fixing structure defines a handlebar receiving area. The support is spaced from the handlebar receiving area of the handlebar fixing structure in a parallel direction parallel to a handlebar axis defined by the handlebar receiving area. The handlebar spacer is disposed between a handlebar and one of the support and the handlebar fixing structure in a mounted state where the operating device is mounted to the handlebar.

18 Claims, 7 Drawing Sheets

(56) References Cited

U.S. PATENT DOCUMENTS

2015/0266540 A1* 9/2015 Snead .................... B62K 23/06
                                                      188/344
2017/0106934 A1* 4/2017 Ruopp ................... B62K 23/06

FOREIGN PATENT DOCUMENTS

| EP | 1514757 B1 | 8/2008 |
| EP | 2338778 B1 | 1/2016 |

* cited by examiner

OPERATING ASSEMBLY

BACKGROUND

Field of the Invention

This invention generally relates to an operating assembly for a small vehicle including a bicycle. More specifically, the present invention relates to a bicycle operating assembly that is mounted to a bicycle handlebar.

Background Information

Small vehicles, in particular bicycles are often provided with one or more component operating devices that are mounted on a handlebar for a rider to easily operate the component operating device. For example, typically, a brake lever is mounted on each end of the handlebar near the handgrip for operating a brake device that apply braking forces to stop rotation of a wheel. These brake levers are typically mounted by a bracket having a band clamp. Similar, for example, a shifter (e.g., a gear shifting operation device) is often mounted adjacent each of the brake levers for shifting gears by operating an operating member in the form of a lever, for example. A conventional gear shifting operation device either has its own band clamp that mounts directly on the handlebar, or is mounted on a mounting bracket on one of the brake levers.

SUMMARY

Generally, the present disclosure is directed to various features of an operating assembly for a small vehicle including a bicycle. Small vehicles as used here in refers to electric and non-electric vehicles regardless of the number of their wheels, but does not include four wheeled vehicles having an internal combustion engine as a power source for driving the wheels, or four wheeled electric vehicles that require a license to operate on public roads. In one feature, an operating assembly for a small vehicle including a bicycle is provided so as to be mounted to a handlebar.

In view of the state of the known technology and in accordance with a first aspect of the present disclosure, an operating assembly for a small vehicle including a bicycle is provided that basically comprises a base member, an operating member, a handlebar fixing structure and a handlebar spacer. The base member includes a support. The operating member is movably coupled to the base member. The handlebar fixing structure is coupled to the base member. The handlebar fixing structure defines a handlebar receiving area. The support is spaced from the handlebar receiving area of the handlebar fixing structure in a parallel direction parallel to a handlebar axis defined by the handlebar receiving area. The handlebar spacer is disposed between a handlebar and one of the support and the handlebar fixing structure in a mounted state where the operating assembly is mounted to the handlebar.

With the operating assembly according to the first aspect, it is possible to easily stabilize the base member with respect to a handlebar.

In accordance with a second aspect of the present invention, the operating assembly according to the first aspect is configured so that the handlebar spacer is disposed between the handlebar and the support in the mounted state.

With the operating assembly according to the second aspect, it is possible to easily access the handlebar spacer.

In accordance with a third aspect of the present invention, the operating assembly according to the second aspect is configured so that the handlebar spacer is movably attached to the base member between a plurality of positions.

With the operating assembly according to the third aspect, it is possible to accommodate different sizes of handlebars.

In accordance with a fourth aspect of the present invention, the operating assembly according to the second or third aspect further comprises an adjustment bolt operatively coupled between the base member and the handlebar spacer to selectively establish the plurality of positions.

With the operating assembly according to the fourth aspect, it is possible to easily adjust position of the handlebar spacer to accommodate different sizes of handlebars.

In accordance with a fifth aspect of the present invention, the operating assembly according to the fourth aspect is configured so that the base member has an adjustment bore threadedly receiving the adjustment bolt.

With the operating assembly according to the fifth aspect, it is possible to easily adjust position of the handlebar spacer to accommodate different sizes of handlebars.

In accordance with a sixth aspect of the present invention, the operating assembly according to the fifth aspect is configured so that the operating member is pivotally coupled to the base member around a pivot axis, and the adjustment bore is arranged further from the handlebar fixing structure than the pivot axis in the parallel direction.

With the operating assembly according to the sixth aspect, it is possible to provide stable support of the base member with respect to the handlebar when the operating member is operated to an actuated position.

In accordance with a seventh aspect of the present invention, the operating assembly according to the fifth or sixth aspect is configured so that the adjustment bore has a receiving opening from which the adjustment bolt is screwed, and the receiving opening is offset from the operating member as viewed in a perpendicular direction that is perpendicular to the pivot axis.

With the operating assembly according to the seventh aspect, it is possible to easily access the adjustment bolt.

In accordance with an eighth aspect of the present invention, the operating assembly according to any one of the first to seventh aspects further comprises a guide structure coupled between the base member and the handlebar spacer.

With the operating assembly according to the eighth aspect, it is possible to stably support the handlebar spacer.

In accordance with a ninth aspect of the present invention, the operating assembly according to the eighth aspect is configured so that the guide structure includes an elongated hole on one of the base member and the handlebar spacer and a guide pin on the other of the base member and the handlebar spacer. The guide pin is disposed in the elongated hole.

With the operating assembly according to the ninth aspect, it is possible to maintain proper orientation of the handlebar spacer.

In accordance with a tenth aspect of the present invention, the operating assembly according to the ninth aspect is configured so that the elongated hole includes a first elongated hole and a second elongated hole separately provided from the first elongated hole, and the guide pin includes a first guide pin disposed in the first elongated hole and a second guide pin disposed in the second elongated hole.

With the operating assembly according to the tenth aspect, it is possible to maintain proper orientation of the handlebar spacer.

In accordance with an eleventh aspect of the present invention, the operating assembly according to any one of the first to tenth aspects is configured so that the base member includes a cylinder housing defining a cylinder bore and having a piston movably disposed in the cylinder bore, and the operating member is operatively coupled to the piston to move the piston within the cylinder bore.

With the operating assembly according to the eleventh aspect, it is possible to use the operating assembly to operate a hydraulically operated device such as a disc brake caliper.

In accordance with a twelfth aspect of the present invention, the operating assembly according to the twelfth aspect is configured so that the cylinder housing has an outlet port provided on a first end portion of the cylinder housing, and the support is provided on a second end portion of the cylinder housing opposite to the first end portion.

With the operating assembly according to the twelfth aspect, it is possible to stably support the cylinder housing.

In accordance with a thirteenth aspect of the present invention, the operating assembly according to any one of the first to twelfth aspects is configured so that the support is a non-movable part of the base member.

With the operating assembly according to the twelfth aspect, it is possible to reduce the number of parts for providing the handlebar spacer.

In accordance with a fourteenth aspect of the present invention, the operating assembly according to any one of the first to thirteenth aspects is configured so that the support overlaps the handlebar receiving area as viewed in the parallel direction.

With the operating assembly according to the fourteenth aspect, it is possible to use the handlebar spacer with handlebars having a smaller diameter and/or handlebars with grip portions having smaller diameters.

In accordance with a fifteenth aspect of the present invention, the operating assembly according to any one of the first to fourteenth aspects is configured so that the handlebar fixing structure includes a first clamp part and a second clamp part, the first clamp part extends from the base member and has a threaded bore. The second clamp part has a first end hingedly connected to the first clamp part and a second end coupled to the first clamp part by a fixing bolt screwed into the threaded bore.

With the operating assembly according to the fifteenth aspect, it is possible to easily attach the operating assembly to the handlebar.

In accordance with a sixteenth aspect of the present invention, the operating assembly according to the fifteenth aspect is configured so that the threaded bore has a fastening axis that is inclined away from the base member in a loosening direction of the fixing bolt, and the second end of the second clamp part is located adjacent the base member while the first end is spaced from the base member.

With the operating assembly according to the sixteenth aspect, it is possible to easily access the fixing bolt.

In accordance with a seventeenth aspect of the present invention, the operating assembly according to any one of the first to sixteenth aspects is configured so that the handlebar fixing structure provides different diameters in the handlebar receiving area along the parallel direction.

With the operating assembly according to the seventeenth aspect, it is possible to securely clamp to handlebars with different diameters.

In accordance with an eighteenth aspect of the present invention, the operating assembly according to the seventeenth aspect is configured so that the handlebar receiving area includes a first portion having a first diameter and a second portion having a second diameter larger than the first diameter. The second portion is closer to the support than the first portion.

With the operating assembly according to the eighteenth aspect, it is possible to securely clamp to handlebars with different diameters.

In accordance with a nineteenth aspect of the present invention, the operating assembly according to the seventeenth or eighteenth aspect is configured so that the handlebar receiving area has a frustoconical shape.

With the operating assembly according to the nineteenth aspect, it is possible to securely clamp to handlebars with different diameters.

In accordance with a twentieth aspect of the present invention, the operating assembly according to the first aspect is configured so that the handlebar spacer is an additional handlebar fixing structure that is not attached to the base member.

With the operating assembly according to the twentieth aspect, it is possible to easily support the base member.

In accordance with a twenty-first aspect of the present invention, the operating assembly according to the twentieth aspect is configured so that the additional handlebar fixing structure includes an additional operating member.

With the operating assembly according to the twenty-first aspect, it is possible to operate another component of the small vehicle.

In accordance with a twenty-second aspect of the present invention, the operating assembly according to any one of the second to twenty-first aspects is configured so that the support has a positioning structure that positions the handlebar spacer.

With the operating assembly according to the twenty-second aspect, it is possible to ensure firm contact between the handlebar and the handlebar spacer.

In accordance with a twenty-third aspect of the present invention, the operating assembly according to the twenty-second aspect is configured so that the positioning structure includes a recess limiting a movement of the handlebar spacer in the parallel direction.

With the operating assembly according to the twenty-third aspect, it is possible to reliably support the handlebar spacer.

In accordance with a twenty-fourth aspect of the present invention, the operating assembly according to any one of the first to twenty-third aspects is configured so that the handlebar spacer includes a first spacer having a first thickness and a second spacer having a second thickness. The first spacer and the second spacer are alternatively disposed between the handlebar and the one of the support and the handlebar fixing structure in the mounted state. The first thickness is different from the second thickness.

With the operating assembly according to the twenty-fourth aspect, it is possible to accommodate handlebars with different diameters.

Also, other objects, features, aspects and advantages of the disclosed operating assembly will become apparent to those skilled in the art from the following detailed description, which, taken in conjunction with the annexed drawings, discloses several embodiments of the operating assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the small vehicle field, in particular bicycle field from this disclosure that the following descriptions of the embodiments are provided for illustration only and not for the purpose of limiting the invention as defined by the appended claims and their equivalents.

Figure 1:
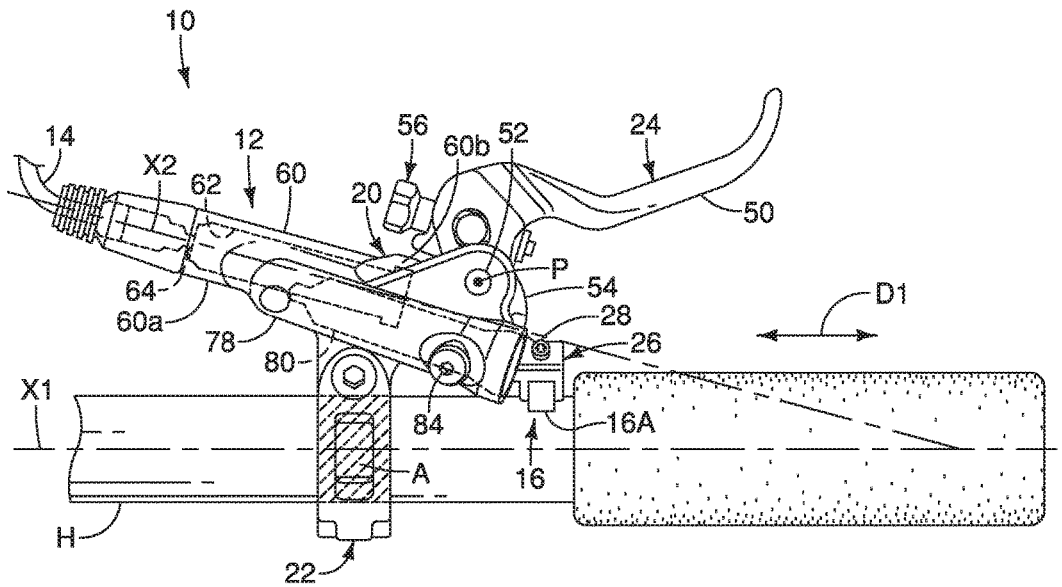
FIG. 1 is a top plan view of a portion of a bicycle handlebar equipped with a bicycle operating assembly that includes a handlebar spacer in accordance with a first illustrated embodiment.
Figure 2:
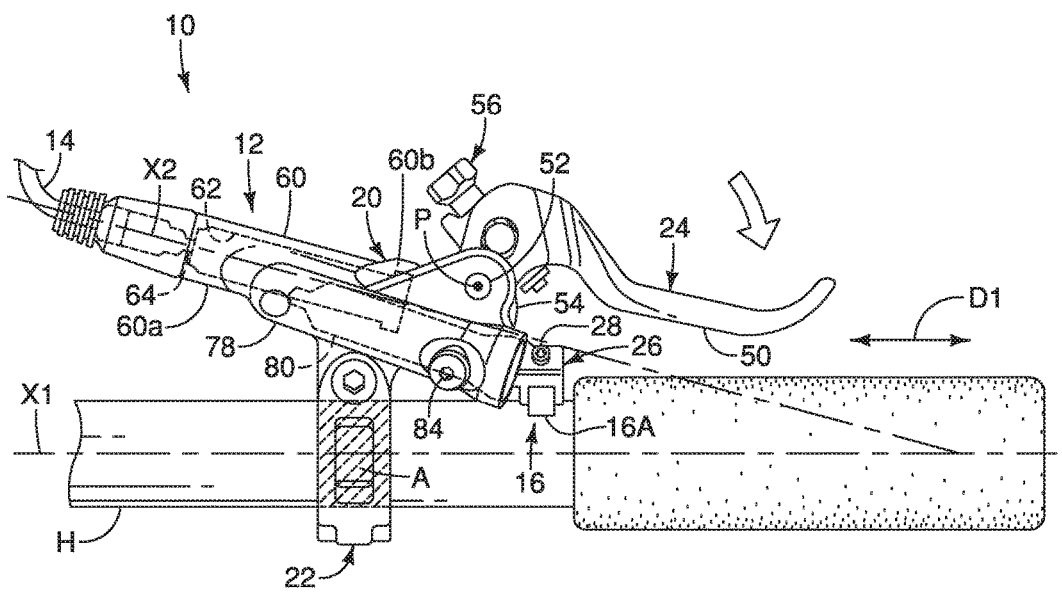
FIG. 2 is a top plan view, similar to FIG. 1, of the operating assembly illustrated in FIGS. 1 to 4 but in which an operating (lever) member has been moved to an actuated position.

Referring initially to FIGS. 1 and 2, an operating assembly 10 for a small vehicle including a bicycle is illustrated in accordance with a first embodiment. Basically, the operating assembly 10 mainly comprises an operating device 12 that is installed on a bicycle of which only a portion of a bicycle handlebar is shown. Here, the operating assembly 10 and the operating device 12 are a bicycle operating assembly and a bicycle operating device, respectively. In more detail, the operating assembly 10 and the operating device 12 are a bicycle hydraulic brake operating assembly and a bicycle hydraulic brake operating device respectively as explained below. The operating device 12 is fluidly connected to the bicycle hydraulic operated device (not shown) by a hydraulic hose 14.

As illustrated in FIGS. 1 and 2, the operating device 12 is a right-hand side hydraulic brake actuating device that is operated by the rider's right hand to actuate the bicycle hydraulic operated device such as a disc brake caliper in the illustrated embodiment. It will be apparent to those skilled in the bicycle field that the configuration of the operating device 12 can be adapted to a left-hand side hydraulic brake actuating device that is operated by the rider's left hand. Also, the operating device 12 can be used with other bicycle components other than a disc brake caliper.

Figure 3:
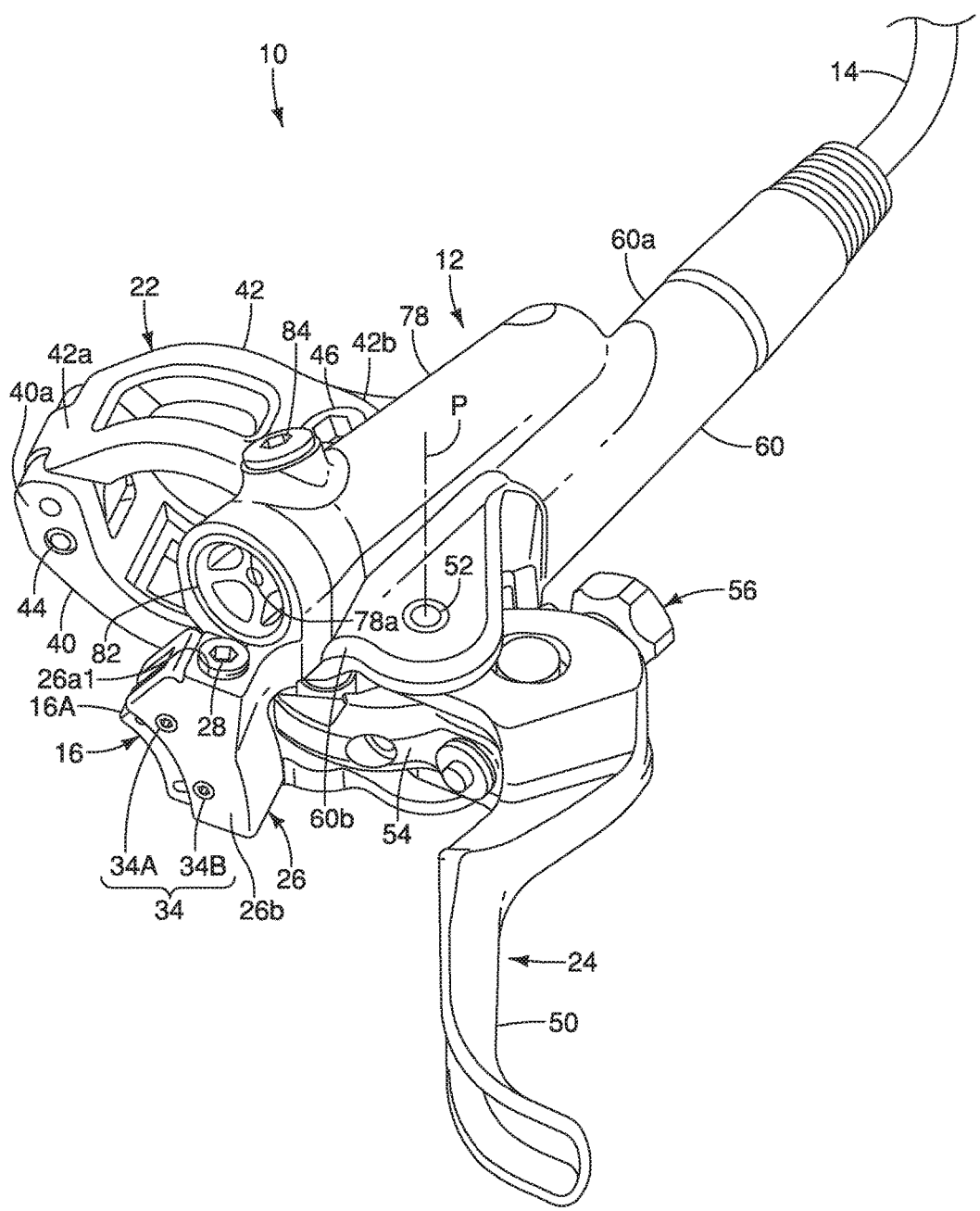
FIG. 3 is a top perspective view of the bicycle operating assembly illustrated in FIGS. 1 and 2.
Figure 4:
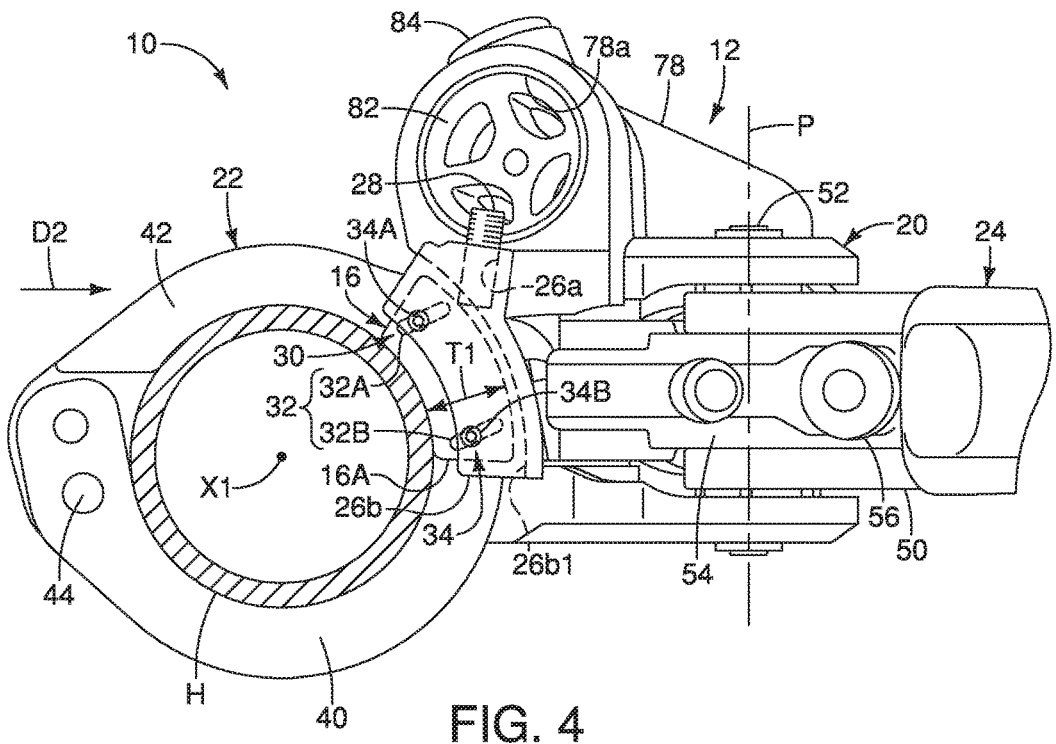
FIG. 4 is an enlarged outside end elevational view of the bicycle operating assembly illustrated in FIGS. 1 to 3 in which the bicycle handlebar shown in cross section and in which a first spacer of the handlebar spacer is contacting the bicycle handlebar.
Figure 5:
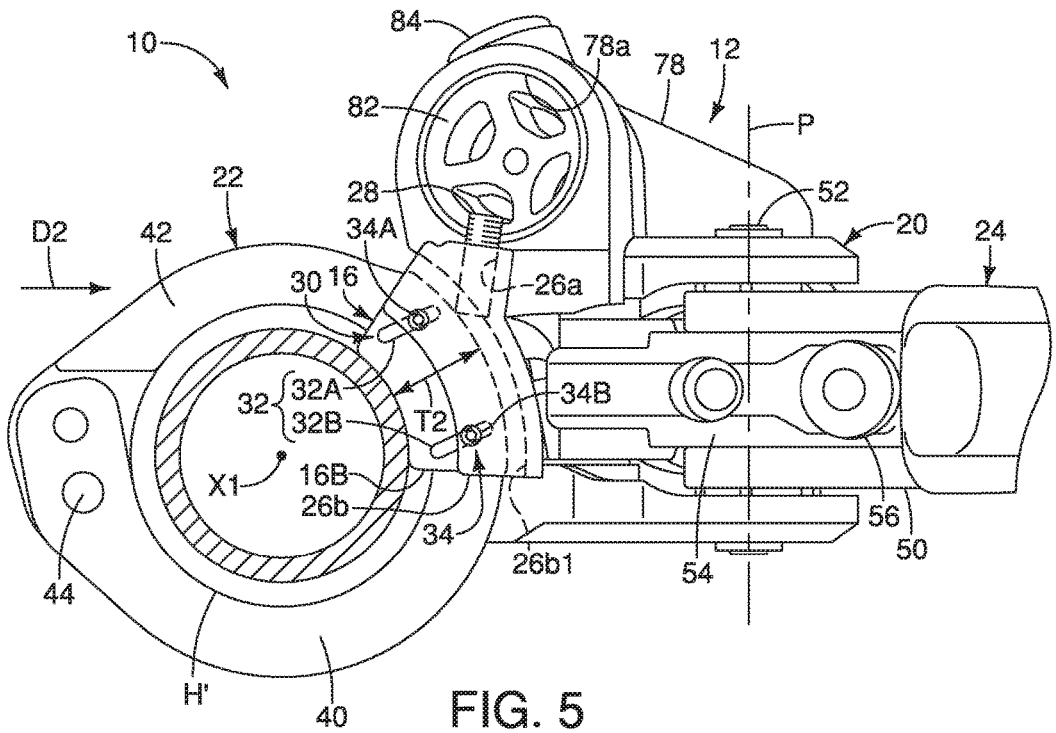
FIG. 5 is an enlarged outside end elevational view, similar to FIG. 4, of the bicycle operating assembly illustrated in FIGS. 1 to 4, but in which a different bicycle handlebar is shown in cross section and in which a second spacer of the handlebar spacer is contacting the bicycle handlebar.

As seen in FIGS. 3 to 5, the operating assembly 10 further comprises a handlebar spacer 16. The handlebar spacer 16 aids in stabilizing the operating device 12 with respect to the handlebar H of FIGS. 1 to 3 or a handlebar H' (FIG. 9) which has a reduced diameter at its gripping portions. Basically, the operating device 12 of the operating assembly 10 comprises a base member 20, a handlebar fixing structure 22 and an operating member 24. The operating member 24 is pivotally coupled to the base member 20 around a pivot axis P. In the illustrated embodiment, the operating device 12 is mounted to the handlebar H or H' by the handlebar fixing structure 22. The handlebar fixing structure 22 is coupled to the base member 20. The handlebar fixing structure 22 defines a handlebar receiving area A. The handlebar receiving area A is shown by the area shaded with diagonal dashes in FIGS. 1, 2 and 7. The handlebar receiving area A has a width dimension corresponding to a width dimension of the handlebar fixing structure 22 in an axial direction of a handlebar axis X1 and a length dimension corresponding to the diameter of the handlebar H or H' at the handlebar fixing structure 22. The handlebar axis X1 extends longitudinally along the handlebar H or H' between opposite ends of the handlebar H or H'.

As seen in FIGS. 3 to 5, the base member 20 includes a support 26. The support 26 is a non-movable part of the base member 20. The support 26 supports the spacer 16 so that the spacer 16 contacts the handlebar H or H'. As seen in FIGS. 1 and 2, the support 26 is spaced from the handlebar receiving area A of the handlebar fixing structure 22 in a parallel direction D1 that is parallel to the handlebar axis X1 defined by the handlebar receiving area A. In this way, the base member 20 is supported by the handlebar H or H' at two spaced apart locations. The handlebar spacer 16 is disposed between the handlebar H or H' and one of the support 26 and the handlebar fixing structure 22 in a mounted state where the operating device 12 is mounted to the handlebar H or H'. As seen in FIGS. 4 and 5, the handlebar spacer 16 includes a first spacer 16A having a first thickness T1 (FIG. 4) and a second spacer 16B having a second thickness T2 (FIG. 5). The first spacer 16A and the second spacer 16B are alternatively disposed between the handlebar H or H' and the one of the support 26 and the handlebar fixing structure 22 in the mounted state. The first thickness T1 is different from the second thickness T2. In other words, the operating assembly 10 can be provided with one or more handlebar spacers for use with the operating device 12. In this way, the operating device 12 can be used with various handlebars. Here, the first thickness T1 is smaller than the second thickness T2.

In the first embodiment, as seen in FIGS. 3 to 5, the handlebar spacer 16 is disposed between the handlebar H or H' and the support 26 in the mounted state. Thus, the user can select which of the first and second spacers 16A and 16B are best suited for a particular bicycle handlebar (e.g., the handlebar H or H'). For example, as seen in FIG. 4, the first spacer 16A is used with the handlebar H. On the other hand, the second spacer 16B is used with the handlebar H'.

As explained below, the handlebar spacer 16 is movably attached to the base member 20 between a plurality of positions. In the first embodiment, as seen in FIGS. 3 to 5, the operating assembly 10 further comprises an adjustment bolt 28 that is operatively coupled between the base member 20 and the handlebar spacer 16 to selectively establish the plurality of positions. The support 26 of the base member 20 has an adjustment bore 26a that is threadedly receiving the adjustment bolt 28. Thus, the handlebar spacer 16 (e.g., the first spacer 16A or the second spacer 16B) moves towards the handlebar H or H' by screwing the adjustment bolt 28 into the adjustment bore 26a. On the other hand, the handlebar spacer 16 (e.g., the first spacer 16A or the second spacer 16B) moves away from the handlebar H or H' by unscrewing the adjustment bolt 28 out of the adjustment bore 26a. As seen in FIG. 4, the handlebar spacer 16 is disposed in a contact position in which the handlebar spacer 16 contacting the handlebar H.

Figure 7:
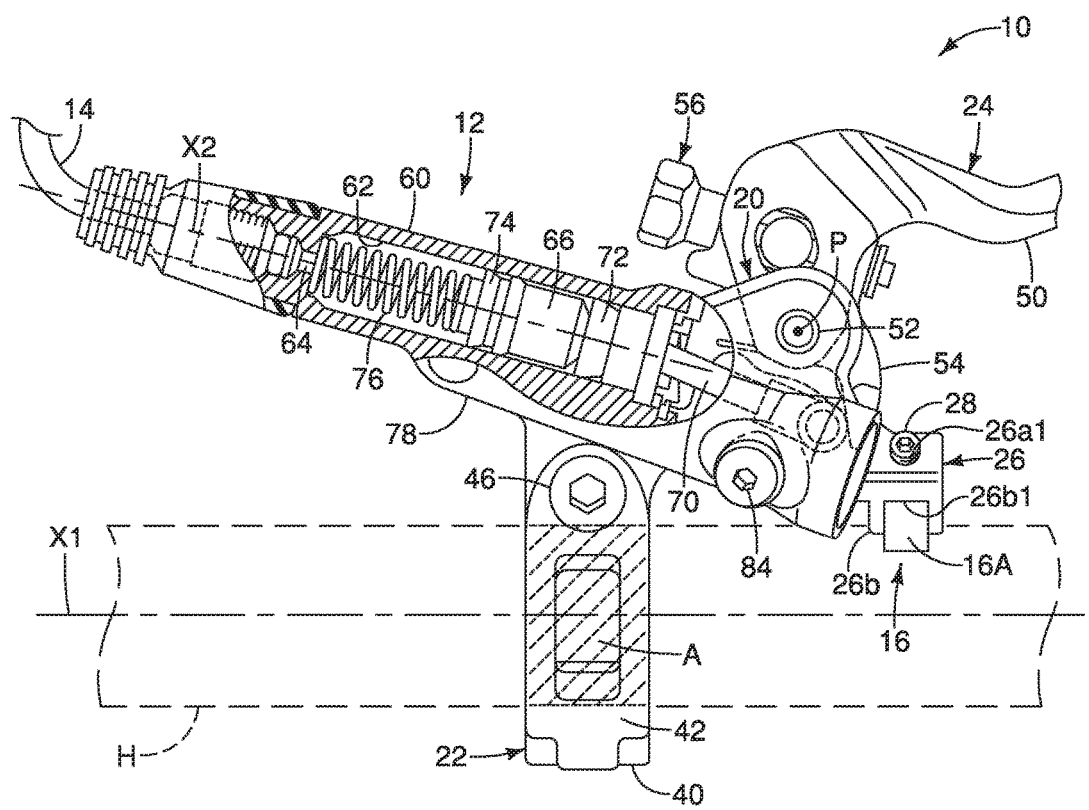
FIG. 7 is a partial cross-sectional view of the bicycle operating assembly illustrated in FIGS. 1 to 5 as taken along section plane perpendicular to a pivot axis of the operating (lever) member and passing through a cylinder axis of a cylinder bore provided in the base member.

As seen in FIG. 7, the adjustment bore 26a is arranged further from the handlebar fixing structure 22 than the pivot axis P in the parallel direction D1. The adjustment bore 26a has a receiving opening 26a1 from which the adjustment bolt 28 is screwed. As seen in FIG. 3, the receiving opening 26a1 is offset from the operating member 24 as viewed in a perpendicular direction D2 (FIGS. 4 and 5) that is perpendicular to the pivot axis P. The support 26 has a positioning structure 26b that positions the handlebar spacer 16. The positioning structure 26b includes a recess 26b1 that limits a movement of the handlebar spacer 16 in the parallel direction D1. Here, the positioning structure 26b has two parallel abutments or walls that define the recess 26b1 therebetween.

As seen in FIGS. 4 and 5, the operating assembly 10 further comprises a guide structure 30 that is coupled between the base member 20 and the handlebar spacer 16. The guide structure 30 includes an elongated hole 32 on one of the base member 20 and the handlebar spacer 16 and a guide pin 34 on the other of the base member 20 and the handlebar spacer 16. The guide pin 34 is disposed in the elongated hole. In this way, the handlebar spacer 16 (e.g., the first spacer 16A or the second spacer 16B) is movably retained on the support 26 of the base member 20. In the first embodiment, as seen in FIGS. 4 and 5, the elongated hole 32 includes a first elongated hole 32A and a second elongated hole 32B that is separately provided from the first elongated hole 32A. The first and second elongated holes 32A and 32B are at least partly disposed in the positioning structure 26b of the support 26. The guide pin 34 includes a first guide pin 34A and a second guide pin 34B. Here, the first and second guide pins 34A and 34B are screwed into the positioning structure 26b of the support 26 and extend into the recess 26b1. As a result, the first guide pin 34A is disposed in the first elongated hole. 32A, while the second guide pin 34B is disposed in the second elongated hole 32B.

Figure 6:
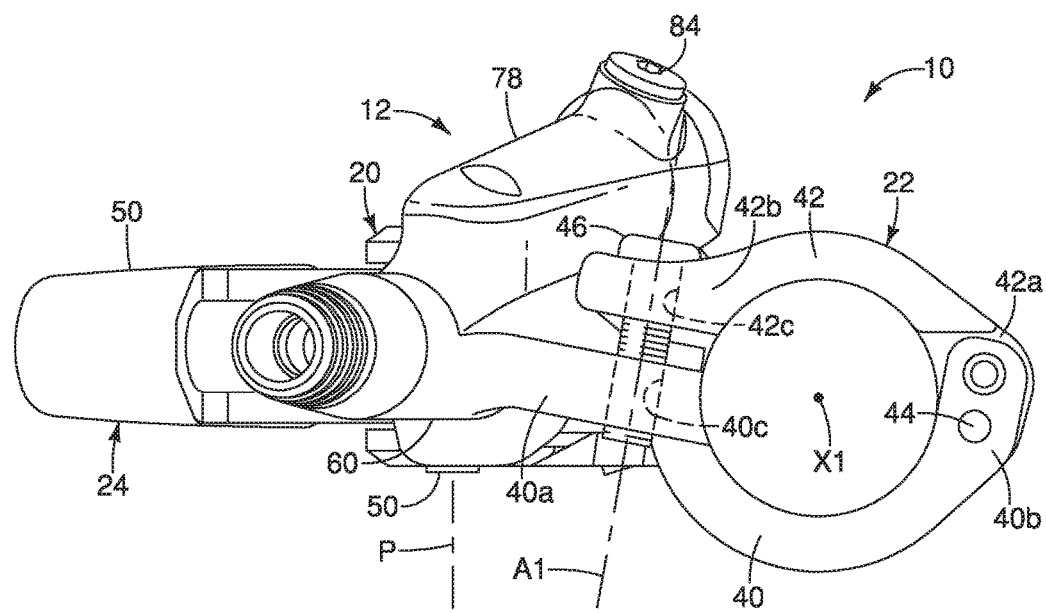
FIG. 6 is an enlarged inside end elevational view of the bicycle operating assembly illustrated in FIGS. 1 to 4.

In the illustrated embodiment, as seen in FIGS. 3 and 6, the handlebar fixing structure 22 includes a first clamp part 40 and a second clamp part 42. The first clamp part 40 is hingedly connected to the second clamp part 42. Specifically, as seen in FIG. 6, the first clamp part 40 has a first end 40a and a second end 40b. The first end 40a is fixed to the base member 20, while the second end 40b is hingedly connected the second clamp part 42 by a pivot pin 44. The first clamp part 40 extends from the base member 20 and has a threaded bore 40c. The second clamp part 42 has a first end 42a and a second end 42b. The first end 42a is hingedly connected to the first clamp part 40, while the second end 42b is coupled to the first clamp part 40 by a fixing bolt 46 that is screwed into the threaded bore 40c. The second end 42b has a through bore 42c through with the bolt 46 passes in the mounted state. In this way, the second end 42b of the second clamp part 42 is releasably attached to the first end 40a of the first clamp part 40 by the fixing bolt 46. By tightening the fixing bolt 46, the second end 42b of the second clamp part 42 is moved towards the first end 40a of the first clamp part 40 to tighten the first and second clamp parts 40 and 42 around the handlebar H. The second end 42b of the second clamp part 42 is located adjacent the base member 20 while the first end 42a is spaced from the base member 20. Also, preferably, the threaded bore 40c has a fastening axis Y that is inclined away from the base member 20 in a loosening direction of the fixing bolt 46.

As seen in FIGS. 1 and 2, in the illustrated embodiment, the operating member 24 is movably coupled to the base member 20. In particular, the operating member 24 is pivotally coupled to the base member 20 around a pivot axis P. The operating member 24 includes a lever 50. Here, the lever 50 is pivotally mounted relative to the base member 20 by a pivot pin 52 from a rest (non-operated) position (FIG. 1) to an operated position (FIG. 2). Here, the operating member 24 is also includes an actuation part 54 and a reach adjustment part 56. The actuation part 54 is adjustably coupled to the lever 50 by the reach adjustment part 56, such that the lever 50 is rotated with respect to the actuation part 54. The reach adjustment part 56 is adjustable to change the relative position of the lever 50 with respect to the actuation part 54. In other words, the reach adjustment part 56 is adjustable to change a rest position or non-actuated position of the lever 50 relative to the base member 20. Since reach adjustment mechanism are known and optional, the reach adjustment part 56 will not be discussed in detail herein.

As seen in FIG. 7, the base member 20 includes a cylinder housing 60 defining a cylinder bore 62. The support 26 is a non-movable part of the cylinder housing 60. Here, the cylinder housing 60 is integrally formed with the support 26 and the first clamp part 40. The cylinder housing 60 has an outlet port 64 that is provided on a first end portion 60a of the cylinder housing 60. The support 26 is provided on a second end portion 60b of the cylinder housing 60 opposite to the first end portion 60a. The cylinder housing 60 has a piston 66 that is movably disposed in the cylinder bore 62. The operating member 24 is operatively coupled to the piston 66 to move the piston 66 within the cylinder bore 62. The cylinder housing 60 defines a hydraulic chamber 68 with a space between the piston 66 and the outlet port 64 of the cylinder housing 60. The pivot axis P of the operating member 24 is arranged such that the operating member 24 pushes the piston 66 within the cylinder bore 62 from a non-actuated position (FIG. 1) to an actuated position (FIG. 2) as the operating member 24 is actuated about the pivot axis P.

The cylinder bore 62 defines a cylinder axis X2. Thus, the piston 66 moves linearly along the cylinder axis X2. In other words, here, the cylinder axis X2 is the center cylinder axis that extends in the direction of movement of the piston 66 inside of the cylinder bore 62. As seen in FIGS. 1 and 2, the cylinder axis X2 is not parallel to the handlebar axis X1 of the handlebar receiving area A as viewed in a direction parallel to the pivot axis P. In particular, the cylinder axis X2 diverges from the handlebar axis X1 of the handlebar receiving area A in an actuation direction of the piston 66.

The operating member 24 further includes a push or connecting rod 70 that operatively connects the lever 50 and the actuation part 54 to the piston 66. In this way, for example, the operating member 24 is coupled to the piston 66 to move the piston 66 within the cylinder bore 62. The piston 66 preferably includes a first sealing ring 72 and a second sealing ring 74. The first and second sealing rings 72 and 74 are in sliding contact with the cylinder bore 62. The first sealing ring 72 is spaced apart from the second sealing ring 74 along the cylinder axis X2 of the cylinder bore 62. The first and second sealing rings 72 and 74 are preferably elastomeric (e.g., rubber) O-rings that each have a uniform cross sectional profile.

As seen in FIG. 7, the hydraulic operating device 10 further comprises a biasing element 76 that is disposed in the cylinder bore 62, and biases the piston 66 to a non-actuated position. Here, the biasing element 76 is a coil compression spring that biases the piston 66 to the non-actuated (rest or non-operated) position. The biasing element 76 also biases the operating member 24 to its rest position (i.e., no external force applied to the lever 50 as seen in FIGS. 1 and 7. Thus, the piston 66 compresses the biasing element 76 as the piston 66 moves in the cylinder bore 62 in response to an operation of the lever 50 of the operating member 24.

Also, in the illustrated embodiment, the base member 20 further comprises a hydraulic reservoir tank 78. Here, the hydraulic reservoir tank 78 is integrally formed with the cylinder housing 60, the support 26 and the first clamp part 40. As seen in FIG. 7, the hydraulic reservoir tank 78 has a hydraulic fluid chamber 80 that is fluidly connected to the cylinder bore 62. Here, the hydraulic fluid within the hydraulic fluid chamber 80 is supplied to the cylinder bore 62 via one or more fluid ports (not shown). Preferably, the hydraulic reservoir tank 78 includes a diaphragm (not shown) that at least partially disposed in the hydraulic fluid chamber 80. The hydraulic reservoir tank 78 has a lid opening 78a that is closed off by a plug 82 disposed in the lid opening 78a. Also, the hydraulic reservoir tank 78 further comprises a bleed valve 84 that is fluidly connected to the hydraulic fluid chamber 80 of the hydraulic reservoir tank 78.

Figure 8:
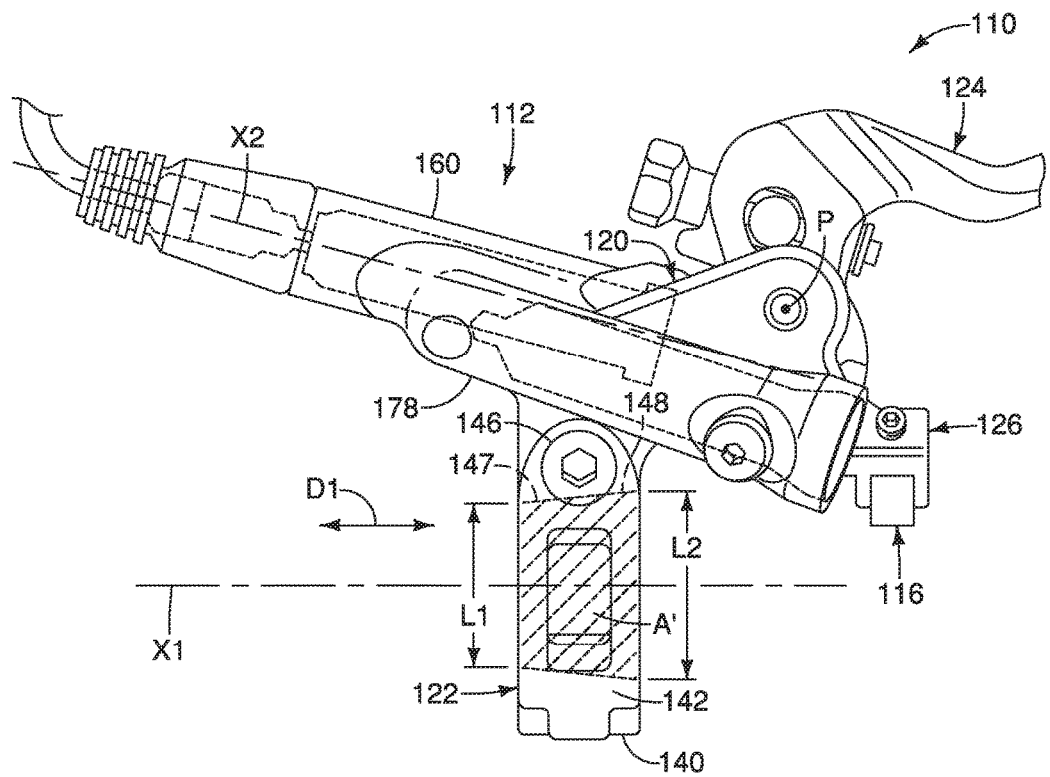
FIG. 8 is a top plan view of an operating assembly in accordance with a second illustrated embodiment.

Referring now to FIG. 8, an operating assembly 110 is illustrated in accordance with a second embodiment. The operating assembly 110 mainly comprises an operating device 112 that is installed a handlebar. The operating device 112 is fluidly connected to the hydraulic operated device (not shown) by a hydraulic hose 14. The operating assembly 110 further comprises a handlebar spacer 116. Similar to the first embodiment, the operating device 112 of the operating assembly 110 comprises a base member 120, a handlebar fixing structure 122 and an operating member 124. The operating member 124 is movably coupled to the base member 120, in particular, the operating member 124 is pivotally coupled to the base member 120 around the pivot axis P. The base member 120 includes a support 126. The operating assembly 110 is identical to the operating assembly 10, except that the handlebar fixing structure 122 has been modified as explained below. Thus, the base member 120, the operating member 124 and the support 126 are identical to the base member 20, the operating member 24 and the support 126.

Here, in the second embodiment, the handlebar fixing structure 122 includes a first clamp part 140 and a second clamp part 142. The first clamp part 140 is hingedly connected to the second clamp part 142 by a pivot pin 144. The second clamp part 142 has one end that is releasably attached to the first clamp part 140 by a fixing bolt 146. Here, the handlebar fixing structure 122 has a handlebar receiving area A' that is shown by the area shaded with diagonal dashes. The handlebar fixing structure 122 provides different diameters in the handlebar receiving area A' along the parallel direction D1 that is parallel to the handlebar axis X1. The handlebar receiving area A' includes a first portion 147 having a first diameter L1 and a second portion 148 having a second diameter L2. The second diameter L2 is larger than the first diameter. The second portion 148 is closer to the support 126 than the first portion 147. The handlebar receiving area A' has a frustoconical shape. The handlebar fixing structure 122 is identical to the handlebar fixing structure 22 except that the handlebar receiving area A' has a frustoconical shape, while the handlebar receiving area A of the handlebar fixing structure 22 has a general cylindrical shape.

Also, similar to the first embodiment, the base member 120 is provide with a cylinder housing 160 having a piston (not shown) and a hydraulic reservoir tank 178. Since the cylinder housing 160 and the hydraulic reservoir tank 178 are identical to the cylinder housing 60 and the hydraulic reservoir tank 78 of the first embodiment, the cylinder housing 160 and the hydraulic reservoir tank 178 will not be discussed and/or illustrated in detail.

Figure 9:
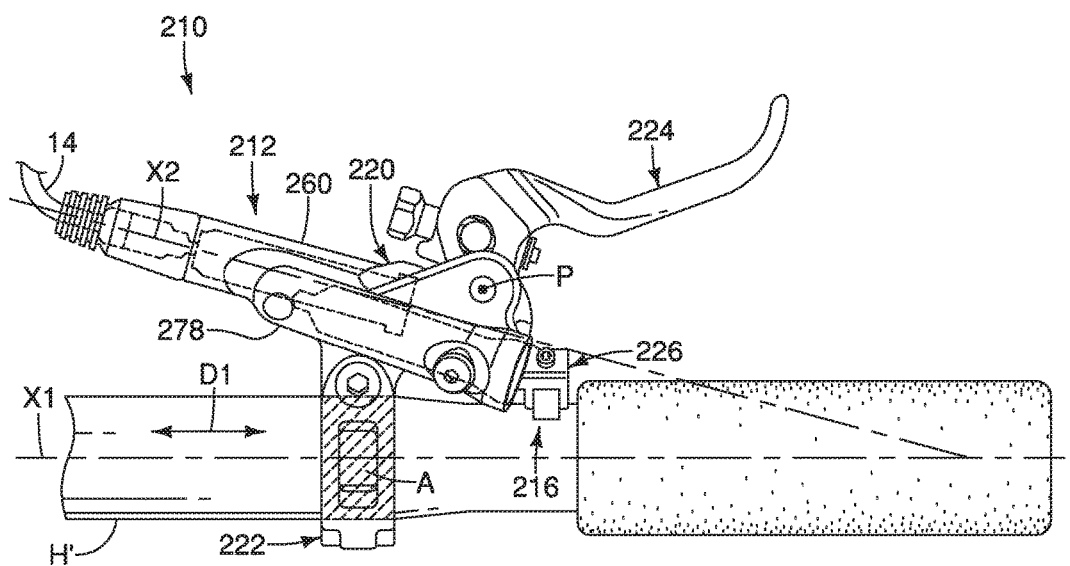
FIG. 9 is a top plan view of an operating assembly in accordance with a third illustrated embodiment.
Figure 10:
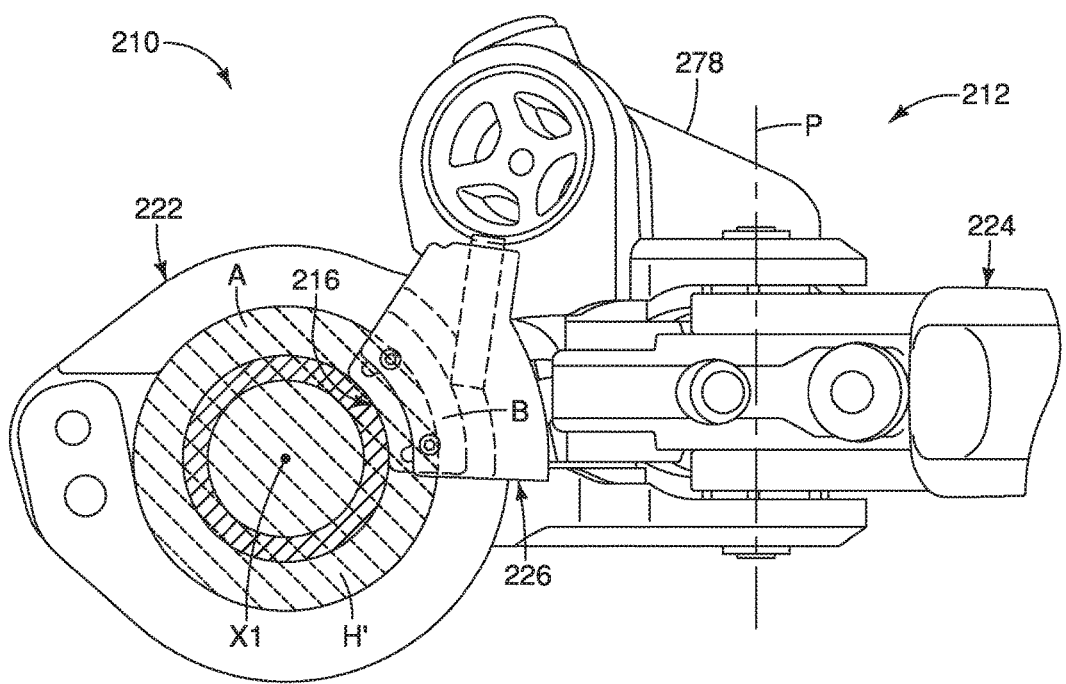
FIG. 10 is an enlarged outside end elevational view of the bicycle operating assembly illustrated in FIG. 10 in which the bicycle handlebar shown in cross section and in which a first spacer of the handlebar spacer is contacting the bicycle handlebar.

Referring now to FIGS. 9 and 10, an operating assembly 210 is illustrated in accordance with a third embodiment. The operating assembly 210 mainly comprises an operating device 212 that is installed the handlebar H'. The operating device 212 is fluidly connected to the hydraulic operated device (not shown) by a hydraulic hose 14. The operating assembly 210 further comprises a handlebar spacer 216. Similar to the first embodiment, the operating device 212 of the operating assembly 210 comprises a base member 220, a handlebar fixing structure 222 and an operating member 224. The operating member 224 is movably coupled to the base member 220. In particular, the operating member 224 is pivotally coupled to the base member 220 around the pivot axis P. The base member 220 includes a support 226. The operating assembly 210 is identical to the operating assembly 10, except that the support 226 has been modified as explained below. Thus, the base member 220, the handlebar fixing structure 222 and the operating member 224 are identical to the base member 20, the handlebar fixing structure 22 and the operating member 24.

Here, in the third embodiment, the support 226 overlaps the handlebar receiving area. A as viewed in the parallel direction D1 that is parallel to the handlebar axis X1. In particular, the support 226 is located towards the handlebar receiving area A such that an overlap area B of the support 226 overlaps with the handlebar receiving area A. Other than configuration of the support 226 to overlap with the handlebar receiving area A, the support 226 is identical to the support 26 as discussed above. Thus, the support 226 will not be discussed and/or illustrated in detail.

Also, similar to the first embodiment, the base member 220 is provide with a cylinder housing 260 having a piston (not shown) and a hydraulic reservoir tank 278. Since the cylinder housing 260 and the hydraulic reservoir tank 278 are identical to the cylinder housing 60 and the hydraulic reservoir tank 78 of the first embodiment, the cylinder housing 260 and the hydraulic reservoir tank 278 will not be discussed and/or illustrated in detail.

Figure 11:
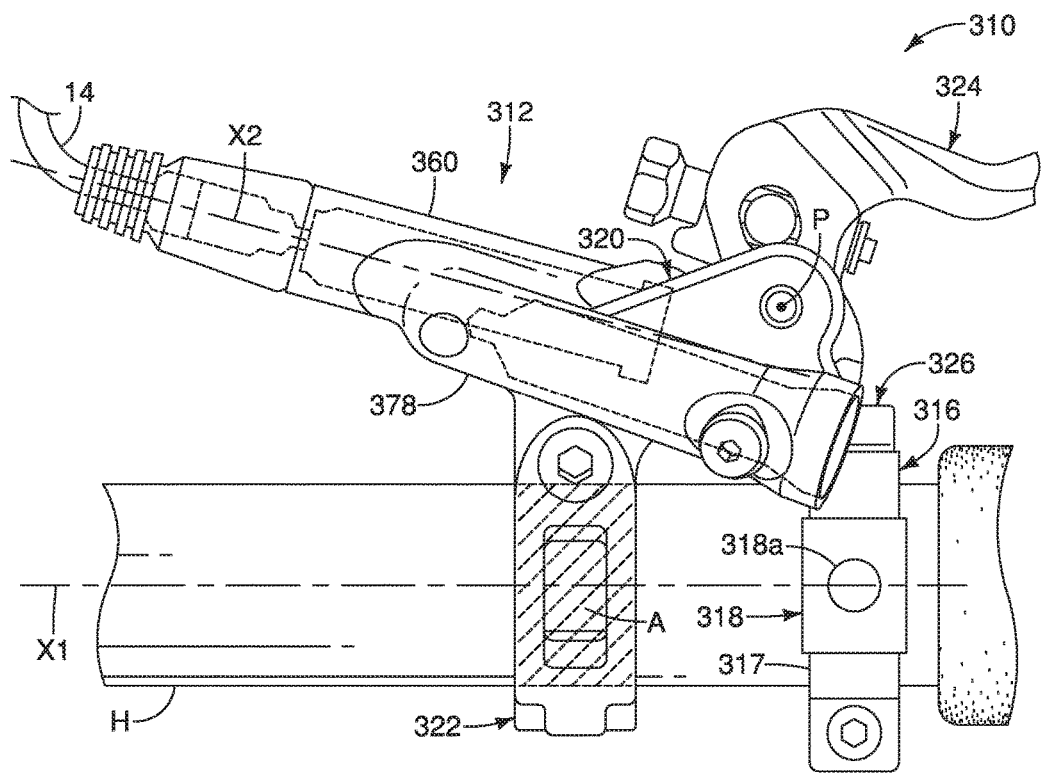
FIG. 11 is a top plan view of an operating assembly in accordance with a fourth illustrated embodiment.

Referring now to FIG. 11, an operating assembly 310 is illustrated in accordance with a fourth embodiment. The operating assembly 310 mainly comprises an operating device 312 that is installed the handlebar H. The operating device 312 is fluidly connected to the hydraulic operated device (not shown) by a hydraulic hose 14. The operating assembly 310 further comprises a handlebar spacer 316.

Similar to the first embodiment, the operating device 312 of the operating assembly 310 comprises a base member 320, a handlebar fixing structure 322 and an operating member 324. The operating member 324 is movably coupled to the base member 320. In particular, the operating member 324 is pivotally coupled to the base member 320 around the pivot axis P. The base member 320 includes a support 326. The operating assembly 310 is identical to the operating assembly 10, except that the handlebar spacer 316 is an additional handlebar fixing structure 317 that is not attached to the base member 320. The additional handlebar fixing structure 317 includes an additional operating member 318. The support 326 is integrally formed on the base member 320 and contacts the additional handlebar fixing structure 317 of the handlebar spacer 316. In this way, the additional handlebar fixing structure 317 of the handlebar spacer 316 fills the gap between the handlebar H and the support 326 so that the base member 320 is supported on the handlebar H via the support 326 and the additional handlebar fixing structure 317.

Here, the additional handlebar fixing structure 317 is a hinged clamp, which is similar to the handlebar fixing structure 22. The additional operating member 318 is an electric operating member. The additional operating member 318 includes an electric switch 318a that is connected to a communication device (not shown) provided on the additional handlebar fixing structure 317. The communication device (not shown) carries out wireless or wired communications with one or more components (not shown). However, the additional operating member 318 is not limited to an electric operating member. Rather, in addition to being an electric operating member, the additional operating member 318 can be any kind of operating member including, but not limited to, a cable type operating member, a hydraulic type operating member, etc.

Also, similar to the first embodiment, the base member 320 is provide with a cylinder housing 360 having a piston (not shown) and a hydraulic reservoir tank 378. Since the cylinder housing 360 and the hydraulic reservoir tank 378 are identical to the cylinder housing 60 and the hydraulic reservoir tank 78 of the first embodiment, the cylinder housing 360 and the hydraulic reservoir tank 378 will not be discussed and/or illustrated in detail.

Figure 12:
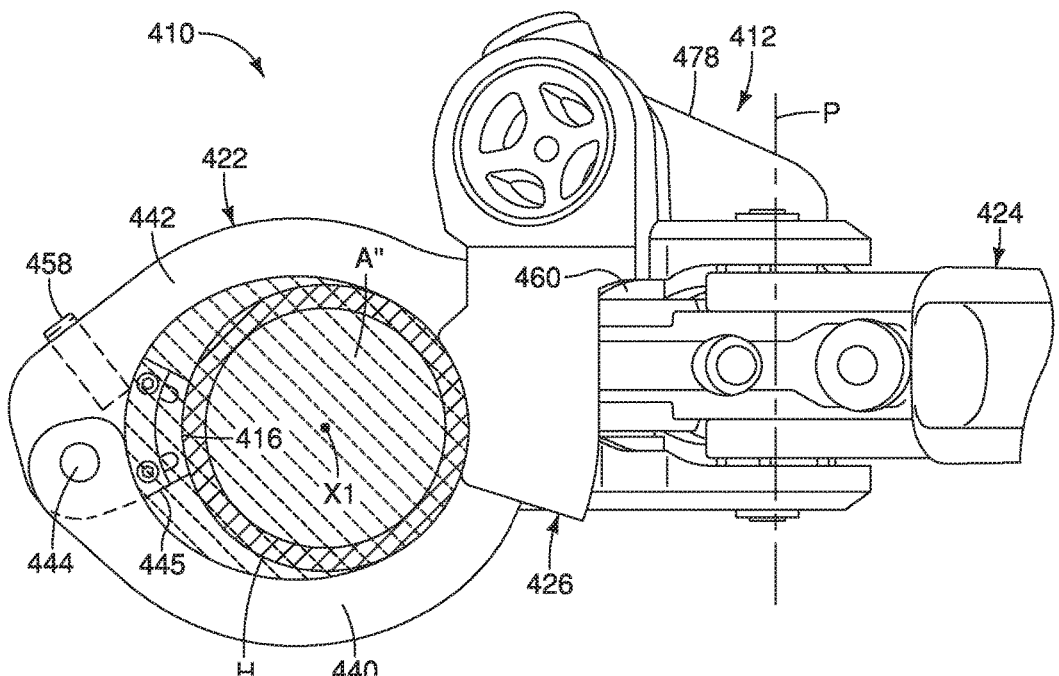
FIG. 12 is a top plan view of an operating assembly in accordance with a fifth illustrated embodiment.

Referring now to FIG. 12, an operating assembly 410 is illustrated in accordance with a fourth embodiment. The operating assembly 410 mainly comprises an operating device 412 that is installed the handlebar H. The operating device 412 is fluidly connected to the hydraulic operated device (not shown) by a hydraulic hose 14. The operating assembly 410 further comprises a handlebar spacer 416. Similar to the first embodiment, the operating device 412 of the operating assembly 410 comprises a base member 420, a handlebar fixing structure 422 and an operating member 424. The operating member 424 is movably coupled to the base member 420. In particular, the operating member 424 is pivotally coupled to the base member 420 around the pivot axis P. The base member 420 includes a support 426. The operating assembly 410 is identical to the operating assembly 10, except that the handlebar spacer 416, the handlebar fixing stricture 422 and the support 426 have been modified as explained below. Thus, otherwise, the base member 420 and the operating member 424 are identical to the base member 420 and the operating member 424.

Here, the support 426 is integrally formed on the base member 220 and contacts the handlebar H, while the handlebar spacer 416 is provided on the handlebar fixing structure 422. In this way, the handlebar spacer 416 is disposed between the handlebar H and the handlebar fixing structure 422 in a mounted state where the operating device 412 is mounted to the handlebar H. Here, in the fourth embodiment, the handlebar fixing structure 422 includes a first clamp part 440 and a second clamp part 442. The first clamp part 440 is hingedly connected to the second clamp part 442 by a pivot pin 444. The second clamp part 442 has one end that is releasably attached to the first clamp part 440 by a fixing bolt (not shown). The handlebar fixing structure 422 has a handlebar receiving area A" that is an elongated or oval shape as viewed in a direction parallel to the handlebar axis X1. The handlebar spacer 416 is adjustably mounted to the second clamp part 442 by a positioning structure 445. The positioning structure 445 includes an adjustment bolt 458 for moving the handlebar spacer 416 towards and away from the handlebar H.

Also, similar to the first embodiment, the base member 420 is provide with a cylinder housing 460 having a piston (not shown) and a hydraulic reservoir tank 478. Since the cylinder housing 460 and the hydraulic reservoir tank 478 are identical to the cylinder housing 60 and the hydraulic reservoir tank 78 of the first embodiment, the cylinder housing 460 and the hydraulic reservoir tank 478 will not be discussed and/or illustrated in detail.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle (a small vehicle) in an upright, riding position and equipped with the operating assembly. Accordingly, these directional terms, as utilized to describe the operating assembly should be interpreted relative to a bicycle (a small vehicle) in an upright riding position on a horizontal surface and that is equipped with the operating assembly. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, while the operating assembly 10 is illustrated as a hydraulic type operating assembly, the features of the present invention as described herein are not limited to a hydraulic type operating assembly. Rather, the features of the present invention can be applied to other types of operating assembly including, but not limited to, a cable type operating assembly, an electric type operating assembly, etc.

Also, for example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operating assembly for a small vehicle including a bicycle comprising:
   a base member including a support;
   an operating member movably coupled to the base member;
   a handlebar fixing structure coupled to the base member, the handlebar fixing structure defining a handlebar receiving area, the support being spaced from the handlebar receiving area of the handlebar fixing structure in a parallel direction parallel to a handlebar axis defined by the handlebar receiving area;
   a handlebar spacer disposed between a handlebar and the support in a mounted state where the operating assembly is mounted to the handlebar, the handlebar spacer being movably attached to the base member between a plurality of positions;
   a guide structure coupled between the base member and the handlebar spacer, the guide structure including an elongated hole on one of the base member and the handlebar spacer and a guide pin on the other of the base member and the handlebar spacer, the guide pin being disposed in the elongated hole; and
   an adjustment bolt operatively coupled between the base member and the handlebar spacer to selectively establish the plurality of positions, the adjustment bolt and the guide pin axially extending in different directions.

2. The operating assembly according to claim 1, wherein the base member has an adjustment bore threadedly receiving the adjustment bolt.

3. The operating assembly according to claim 2, wherein the operating member is pivotally coupled to the base member around a pivot axis, and
   the adjustment bore is arranged further from the handlebar fixing structure than the pivot axis in the parallel direction.

4. The operating assembly according to claim 2, wherein the adjustment bore has a receiving opening from which the adjustment bolt is screwed, and
   the receiving opening is offset from the operating member as viewed in a perpendicular direction that is perpendicular to the pivot axis.

5. The operating assembly according to claim 1, wherein the elongated hole includes a first elongated hole and a second elongated hole separately provided from the first elongated hole, and
   the guide pin includes a first guide pin disposed in the first elongated hole and a second guide pin disposed in the second elongated hole.

6. The operating assembly according to claim 1, wherein the base member includes a cylinder housing defining a cylinder bore and having a piston movably disposed in the cylinder bore, and
   the operating member is operatively coupled to the piston to move the piston within the cylinder bore.

7. The operating assembly according to claim 6, wherein the cylinder housing has an outlet port provided on a first end portion of the cylinder housing, and
   the support is provided on a second end portion of the cylinder housing opposite to the first end portion.

8. The operating assembly according to claim 1, wherein the support is a non-movable part of the base member.

9. The operating assembly according to claim 1, wherein the support overlaps the handlebar receiving area as viewed in the parallel direction.

10. The operating assembly according to claim 1, wherein the handlebar fixing structure includes a first clamp part and a second clamp part,
    the first clamp part extends from the base member and has a threaded bore, and
    the second clamp part has a first end hingedly connected to the first clamp part and a second end coupled to the first clamp part by a fixing bolt screwed into the threaded bore.

11. The operating assembly according to claim 10, wherein
    the threaded bore has a fastening axis that is inclined away from the base member in a loosening direction of the fixing bolt, and
    the second end of the second clamp part is located adjacent the base member while the first end is spaced from the base member.

12. The operating assembly according to claim 1, wherein the handlebar fixing structure provides different diameters in the handlebar receiving area along the parallel direction.

13. The operating assembly according to claim 12, wherein
   the handlebar receiving area includes a first portion having a first diameter and a second portion having a second diameter larger than the first diameter, and
   the second portion is closer to the support than the first portion.

14. The operating assembly according to claim 12, wherein
   the handlebar receiving area has a frustoconical shape.

15. The operating assembly according to claim 1, wherein the support has a positioning structure that positions the handlebar spacer.

16. The operating assembly according to claim 15, wherein
   the positioning structure includes a recess limiting a movement of the handlebar spacer in the parallel direction.

17. The operating assembly according to claim 1, wherein the handlebar spacer includes a first spacer having a first thickness and a second spacer having a second thickness, the first spacer and the second spacer being alternatively disposed between the handlebar and the one of the support and the handlebar fixing structure in the mounted state, the first thickness is different from the second thickness.

18. The operating assembly according to claim 1, wherein an axial end of adjustment bolt contacts an outer surface of the handlebar spacer.

\* \* \* \* \*